United States Patent
Abramovici et al.

(10) Patent No.: US 8,397,976 B2
(45) Date of Patent: Mar. 19, 2013

(54) METHOD FOR COHESIVELY BONDING METAL TO A NON-METALLIC SUBSTRATE USING CAPACITORS

(75) Inventors: Eugen Abramovici, Toronto (CA); David E. Gevers, Lafayette, IN (US); Lucian M. Silvian, West Lafayette, IN (US)

(73) Assignee: Nexgeneering Technology LLC, West Lafayette, IN (US)

( * ) Notice: Subject to any disclaimer, the term of this patent is extended or adjusted under 35 U.S.C. 154(b) by 0 days.

(21) Appl. No.: 13/462,926

(22) Filed: May 3, 2012

(65) Prior Publication Data
US 2012/0273125 A1 Nov. 1, 2012

Related U.S. Application Data

(62) Division of application No. 12/045,347, filed on Mar. 10, 2008, now Pat. No. 8,186,566.

(60) Provisional application No. 60/894,213, filed on Mar. 10, 2007.

(51) Int. Cl.
 *B23K 31/02* (2006.01)
 *B23K 9/10* (2006.01)

(52) U.S. Cl. ......... 228/178; 228/121; 219/111; 219/113

(58) Field of Classification Search ................. 228/178; 219/111, 113
See application file for complete search history.

(56) References Cited

U.S. PATENT DOCUMENTS

| | | | |
|---|---|---|---|
| 2,077,600 A * | 4/1937 | Watson | ........................ 219/113 |
| 3,541,671 A | 11/1970 | Frachot | |
| 4,144,110 A | 3/1979 | Luc | |
| 4,330,704 A | 5/1982 | Jensen | |
| 4,639,388 A | 1/1987 | Ainsworth et al. | |
| 4,844,323 A | 7/1989 | Kondo et al. | |
| 5,079,070 A * | 1/1992 | Chalco et al. | ................. 428/209 |
| 5,153,057 A | 10/1992 | Corbett et al. | |
| 5,697,545 A | 12/1997 | Jennings et al. | |
| 6,187,260 B1 | 2/2001 | Qin et al. | |
| 6,410,878 B1 * | 6/2002 | Guerin et al. | .............. 219/117.1 |
| 6,450,393 B1 | 9/2002 | Doumanidis et al. | |
| 6,457,629 B1 | 10/2002 | White | |
| 6,645,610 B1 | 11/2003 | Reis et al. | |
| 6,652,958 B2 | 11/2003 | Tobita | |
| 6,814,823 B1 | 11/2004 | White | |
| 6,945,448 B2 * | 9/2005 | Medlin et al. | .............. 228/248.1 |
| 7,041,934 B2 * | 5/2006 | Lee et al. | ...................... 219/113 |
| 7,090,113 B2 | 8/2006 | Carrier et al. | |
| 7,334,997 B2 | 2/2008 | Karafillis | |
| 7,374,474 B2 | 5/2008 | Nishiyama et al. | |
| 7,431,980 B2 | 10/2008 | Woodman et al. | |
| 7,459,044 B2 | 12/2008 | Khan et al. | |
| 7,507,310 B2 | 3/2009 | Manicke et al. | |
| 7,823,763 B2 | 11/2010 | Sachdev et al. | |

(Continued)

FOREIGN PATENT DOCUMENTS

JP 06277854 A 10/1994

*Primary Examiner* — Kiley Stoner
*Assistant Examiner* — Carlos Gamino
(74) *Attorney, Agent, or Firm* — Bose McKinney & Evans LLP

(57) ABSTRACT

A process for cohesive bonding between a metal surface and a nonmetallic substrate is provided. The non-metallic substrate may comprise a plurality of microfilaments and/or nanofilaments dispersed into and below the surface of the substrate. The application of pressure and laterally-oriented high frequency and low amplitude vibration may allow for diffusion bonding between the metal surface and material of the nanofilaments. Another method includes discharging energy from a bank of capacitors to melt adjoining surfaces of the metal surface and nonmetallic substrate. Additionally, a cohesive bonding method may further comprise converting electrical oscillations of ultrasonic frequency into ultrasonic vibrations which are transmitted to the metal body and/or substrate for fusing the two materials together.

8 Claims, 7 Drawing Sheets

U.S. PATENT DOCUMENTS

| | | |
|---|---|---|
| 7,927,708 B2 | 4/2011 | Mizrahi |
| 7,959,058 B1 | 6/2011 | Crane et al. |
| 2010/0239428 A1 | 9/2010 | Carrier et al. |
| 2011/0200816 A1 | 8/2011 | Mizrahi et al. |

* cited by examiner

METHOD FOR COHESIVELY BONDING METAL TO A NON-METALLIC SUBSTRATE USING CAPACITORS

RELATED APPLICATIONS

This application is a division of U.S. application Ser. No. 12/045,347 now U.S. Pat. No. 8,186,566, filed on Mar. 10, 2008 which claims priority to U.S. Provisional Application Ser. No. 60/894,213, filed Mar. 10, 2007, both of which are hereby incorporated by reference in their entirety.

BACKGROUND

The present invention relates generally to a method for cohesively bonding metal to a non-metallic substrate and more particularly, to the use of metallic micro and nano size filaments, embedded within the non-metallic material, to create cohesive bonds with the metallic material.

Non-metallic materials, and in particular composite materials such as graphite-fibers or fiberglass fibers with epoxy matrices, are notoriously difficult to attach to metallic materials. The most commonly used methods to create such assemblies are adhesive bonding or the use of fastening devices. Both of these methods have disadvantages related to disbonding due to water infiltration and corrosion or due to the fracture of the superficial surfaces where the fastening devices are connected to the composite material.

Various methods are commonly used to attach two metal surfaces to each other. Besides fastening, welding is such a method; however, many others such as brazing, soldering, diffusion bonding and adhesive bonding are widely used in industry. All of these methods are generally dependent upon a plurality of parameters including applied pressure, bonding temperature, time, and the method of heat application. The surface finish of the components can play an important role, as well. To form a cohesive bond, it is important for two, clean and flat surfaces to come into atomic contact with one another, with microasperities and surface layer contaminants being removed from the bonding faces before bonding.

Welding, in general, is making use of high temperatures to melt the two metals in contact with each other or to melt a filler material, creating a pool of common, molten alloy that when solidified, would strongly connect the two together. On the other side, the diffusion bonding process is known to create a strong bond between two metals without melting them by using only pressure and lower temperatures, and without the introduction of any extrinsic material.

However, bonding a metal surface to a non-metallic substrate generally cannot be accomplished by any of the methods outlined above and often requires the addition of an extrinsic material, such as an adhesive. Hence, adhesive bonding or fastening methods are extensively used to connect metallic materials to non-metallic substrates.

Accordingly, it would be desirable to have a bonding method that forms a strong cohesive bond between a metal body and a non-metallic substrate.

SUMMARY OF THE INVENTION

In one aspect of the present invention there is provided a method for cohesive bonding a metal body to a substrate comprising the steps of contacting the metal body to a surface of the substrate, the substrate comprising a plurality of microfilaments or nanofilaments dispersed into or below the surface of the substrate and the metal body surface comprising microscopic asperities which contact the plurality of microfilaments or nanofilaments, applying normally-oriented pressure on the metal body and laterally-oriented high frequency and low amplitude vibrations to the substrate and forming a cohesive bond between the metal body and the substrate.

In another aspect of the present invention there is provided a method for cohesive bonding a metal body to a substrate comprising the steps of coupling a plurality of capacitors to the metal body and the substrate, contacting the metal body to the substrate, the substrate comprising a plurality of microfilaments or nanofilaments, wherein the microfilaments or nanofilaments provide microscopic asperities on at least the substrate surface which contacts the metal body, discharging energy from the plurality of capacitors to raise the temperature of the surfaces of the metal body and the substrate which contact one another, applying pressure on the metal body or substrate and forming a cohesive bond between the metal body and the substrate.

In a further aspect of the present invention there is provided a method for cohesive bonding a metal body to a substrate comprising the steps of contacting the metal body to the substrate, the substrate comprising a plurality of microfilaments or nanofilaments, wherein the microfilaments or nanofilaments provide microscopic asperities on at least the substrate surface which contacts the metal body, positioning a sonotrode to contact the metal body, applying normally-oriented pressure on the metal body or substrate, vibrating the metal body or substrate and forming a cohesive bond between the metal body and the substrate.

These and other features, aspects and advantages of the present invention will become better understood with reference to the following drawings, description and claims.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Broadly the present invention provides methods for cohesively bonding the surface of a metal body to a non-metallic substrate which may comprise contacting a metal surface of the metal body with a surface of the substrate. The substrate may comprise a plurality of microfilaments and/or nanofilaments which may provide microscopic asperities on the surface of the substrate in contact with the metal surface. The method may further use a variety of known joining processes such as friction welding, capacitor-discharge welding, ultrasonic welding and diffusion bonding to connect the filaments with the metallic body. These methods may comprise simultaneously applying normally-oriented pressure to the metal surface and laterally-oriented high frequency and low amplitude vibrations to the substrate and forming a cohesive bond between the metal surface and the substrate. The applied loads are typically below those loads which would cause macro-deformation of the components' materials. This process, known as localized friction welding, creates localized increases of contact temperature that do not exceed 0.5-0.8 times the melting point temperature of such materials and the temperature of the materials can remain in this range for 0.004 seconds to over 3600 seconds depending upon the type of materials being bonded, the joint properties of these materials, and the heating method being used.

Other joining processes may comprise radiant heating, induction heating and direct or indirect resistance heating. For example, the diffusion bonding process may be further assisted by additionally exposing the components' materials to higher temperatures, inert gases and/or a vacuum. While not wishing to be bound by any particular theory, the cohesive bond may be formed by diffusion of the microfilament and/or nanofilament material into the metal layer, thus forming a stronger bond than one without the presence of the microfilaments and/or nanofilaments.

Figure 1:
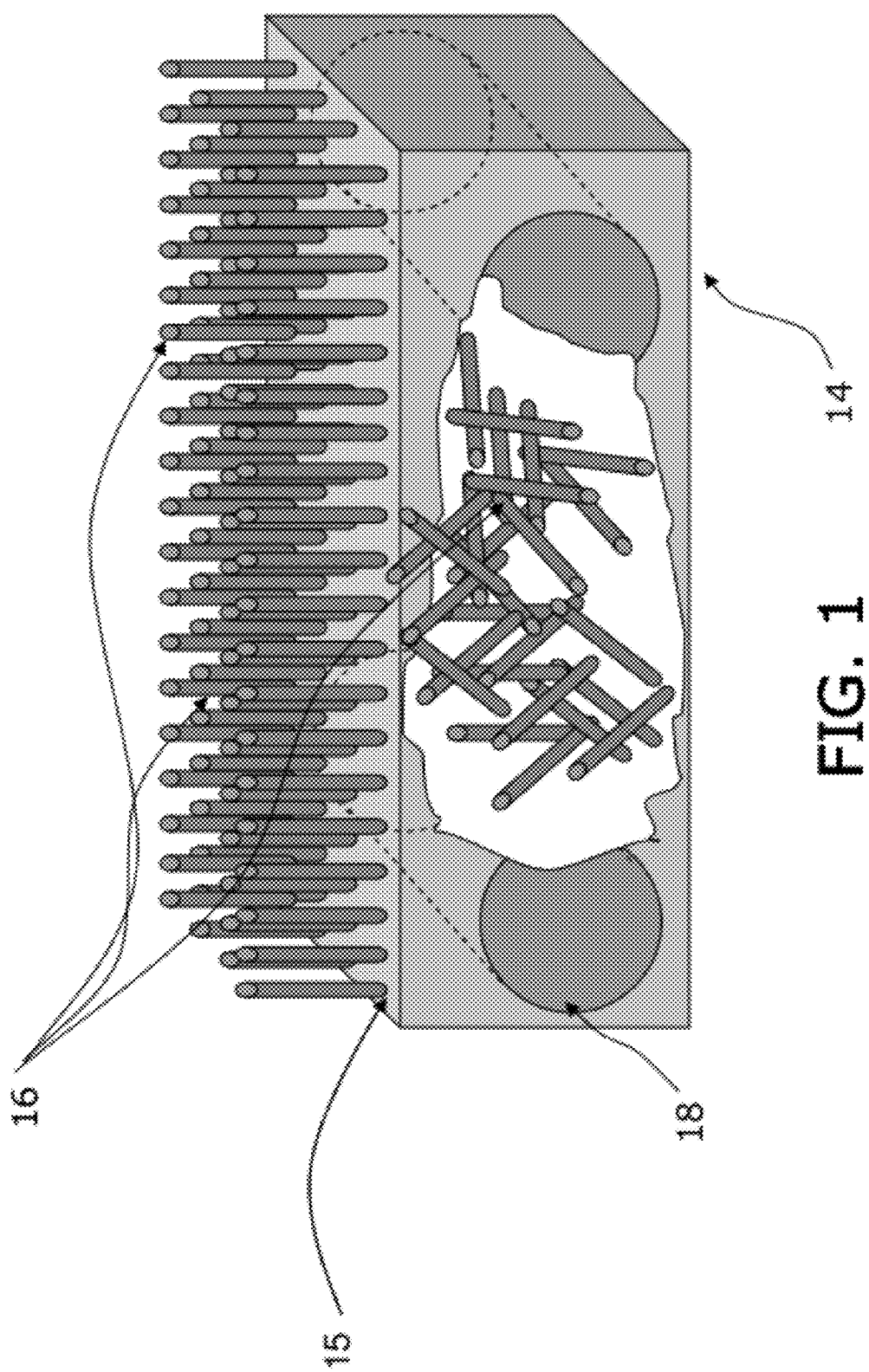
FIG. 1 is a schematic of composite material comprising a matrix and fibers having a plurality of microfilaments and/or nanofilaments embedded in the matrix.

An exemplary embodiment of a composite material (hereinafter referred to as "substrate") is shown in FIG. 1. The substrate 14 comprises a matrix that may include fibers 18 and a plurality of microfilaments and/or nanofilaments 16 randomly oriented and embedded within the matrix. The microfilaments and/or nanofilaments 16 are metallic, but alternatively they may comprise ceramic, plastic, or any other material known to the skilled artisan. Some or all of the plurality of microfilaments and/or nanofilaments 16 may extend out of a surface 15 of the substrate 14, whereas others may be embedded in the substrate without extending out of the substrate.

In one embodiment of the present invention, substrate 14 of FIG. 1 may be any material desired to form a bond to a metal surface 12 and which may have microfilaments and/or nanofilaments 16 dispersed therein. In general, the substrate 14 comprises non-metallic material. In one exemplary embodiment, the substrate 14 may comprise a composite material such as, but not limited to, a metal matrix composite, a ceramic composite or a polymer composite. The polymer composite may comprise unidirectional or multidirectional oriented fibers of graphite, fiberglass, aramid or a combination thereof. Substrate 14 may comprise any size or form desired. It may be preformed into a desired shape or part. Alternatively, it may be shaped or formed after bonding to the metal surface.

As described above with reference to FIG. 1, the substrate 14 may comprise a plurality of microfilaments and/or nanofilaments 16. The plurality of microfilaments and/or nanofilaments 16 may be dispersed on and/or below a surface 15 (see FIG. 1) of the substrate 14. In one exemplary embodiment, the plurality of microfilaments and/or nanofilaments 16 are introduced individually into the substrate 14 and may create an intricate network in the substrate 14. In an alternate embodiment, the plurality of microfilaments and/or nanofilaments 16 may be introduced into the substrate 14 being physically connected to one another, forming a structure such as, but not limited to, a micrometric or nanometric sized foam. It will be appreciated that a network of microfilaments and/or nanofilaments 16 may provide firstly, a strong adhesion bond within the substrate 14 and subsequently provide the opportunity for bonding between metal surface 12 and substrate 14.

Figure 2:
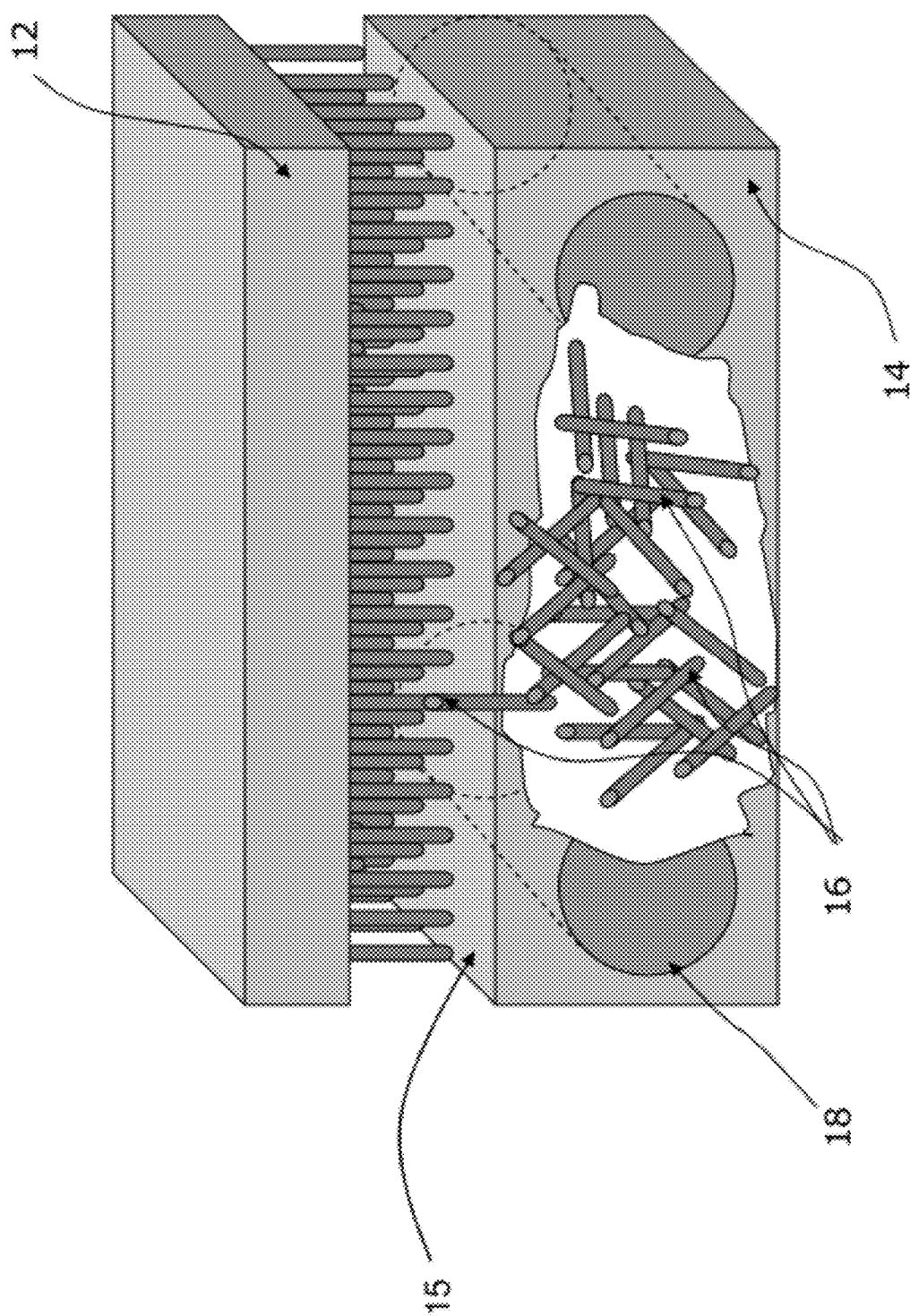
FIG. 2 is a schematic of the composite material of FIG. 1 with a metal body to be bonded to the matrix.

In one embodiment of a cohesive bonding process, a metal-bonded substrate is shown in FIG. 2. In this process, a metal body 12 may be cohesively bonded to the substrate 14 via one of several bonding methods, three of which will be described below in further detail. Similar to the substrate shown in FIG. 1, the substrate 14 in FIG. 2 may comprise a plurality of randomly-oriented microfilaments and/or nanofilaments 16 and a plurality of aligned fibers 18 dispersed throughout substrate 14 and which are usually introduced as a specially fabricated cloth.

The microfilaments and/or nanofilaments 16 may form microscopic asperities on the surface 15 of the substrate 14 and may change the material characteristics of the substrate 14 at or near the surface 15. The plurality of microfilaments and/or nanofilaments 16 may be dispersed in the substrate 14 during the manufacture of the substrate 14. Alternately, the microfilaments and/or nanofilaments 16 may be dispersed in the substrate 14 afterwards by other methods known in the art. The plurality of microfilaments and/or nanofilaments 16 may be distributed throughout the substrate 14 to provide the optimal cohesive bond between the substrate 14 and the surface of the metal body 12. The plurality of microfilaments and/or nanofilaments 16 may be evenly distributed throughout the substrate 14 or they may be concentrated at the surface 15 of the substrate 14 where the surface of the metal body 12 will be bonded, gradually decreasing in the substrate 14 away from the surface 15.

In another embodiment of the present invention the microfilaments and/or nanofilaments 16 may comprise a material capable of bonding with the metal body 12. In one exemplary embodiment, the microfilaments and/or nanofilaments 16 may comprise a metal such as, but not limited to, stainless steel or a titanium alloy. In another embodiment, the microfilaments and/or nanofilaments 16 may comprise a material capable of sustaining the bond or joint between the substrate 14 and the metal body 12 and may also have desired corrosion resistance as well as little or no adherent oxide layer.

In one embodiment in which micro or nanofilaments produced using the present state of art are embedded in the substrate 14, those filaments 16 may have a diameter of less than 100 nm up to 1000 nm in cross-sectional dimension. In an exemplary embodiment, nanofilaments 16 produced using other, advanced technologies may be less than about 100 nm in cross-sectional dimension. It will be appreciated that the cross-sectional dimension of the nanofilaments 16 may be small enough to provide an optimal number of interactions with the metal body 12 but still retain integrity and strength. Based on the present technology the nanofilaments 16 may have a length less than about 400 µm. The nanofilaments 16 may be made by processes known in the art such as, but not limited to, the process described in U.S. Pat. No. 6,444,256, which is herein incorporated by reference In a different embodiment of the present invention, the surface of the metal body 12 may be the surface of a metal strip, a metal sheet, a metal plate or a metal block. It is contemplated that any metal surface found on any part or material may be bonded to the substrate 14 using the process of the present application. The metal surface 12 may comprise any metal having the desired properties for the application in which the bonded metal and composite complex 10 are to be used. By way of a non-limiting example, the metal body surface 12 may comprise stainless steel or titanium.

Figure 3:
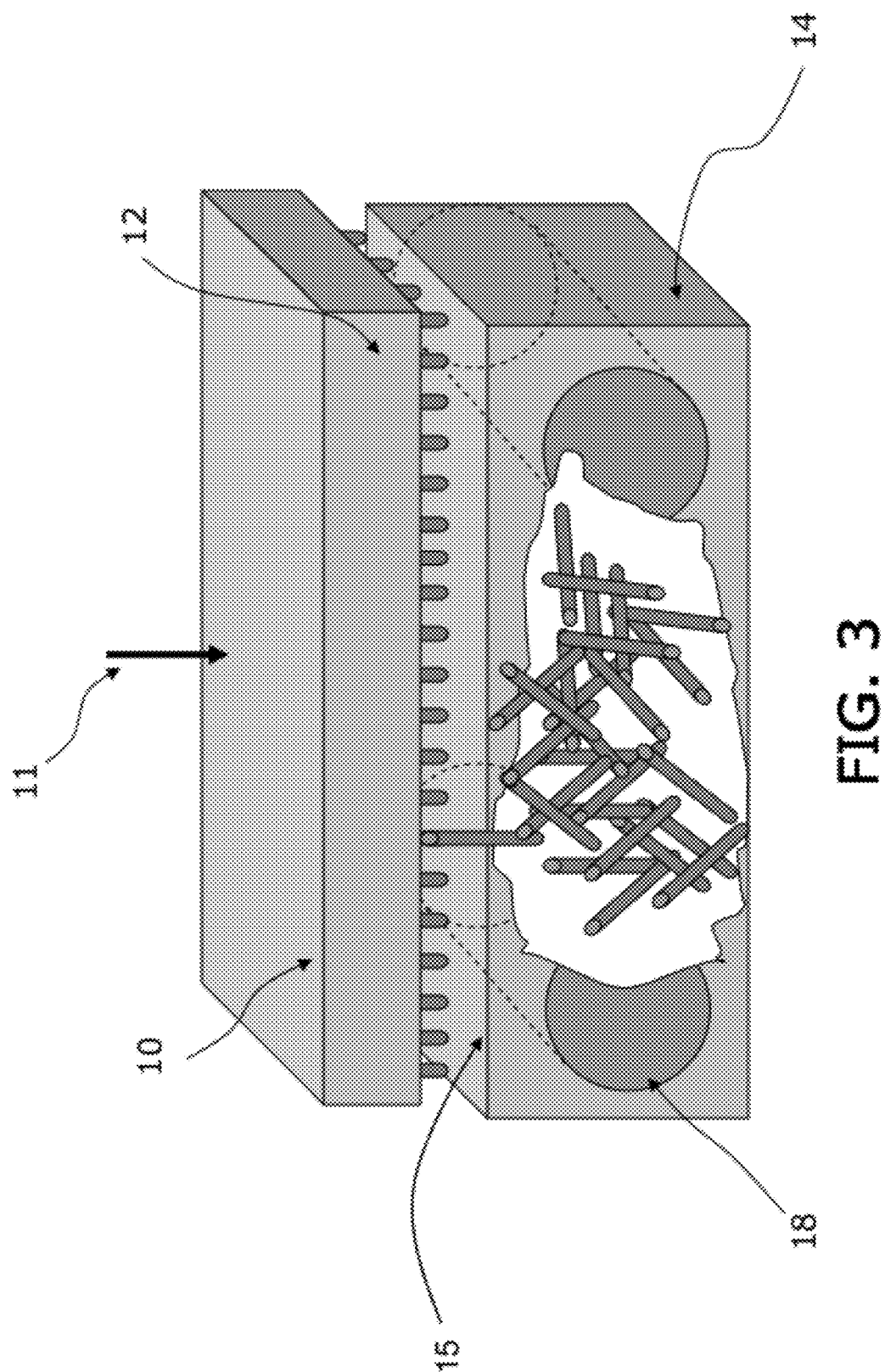
FIG. 3 is a schematic of the metal body of FIG. 2 being compressed to the matrix.

In FIG. 3, a method for cohesive bonding a metal surface 12 to a substrate 14 is provided. In one embodiment, pressure may be applied in a direction 11 against the metal body 12 such that the metal body 12 is compressed against the substrate 14. The pressure can be applied uniaxially or isostatically. Uniaxial pressure generally requires lower pressure in the range of 3-10 MPa to avoid macro-deformation of the bonded materials. Additionally, this process typically requires good surface finish on the mating surfaces as the contribution to bonding provided by plastic yielding is restricted. In general, surface finishes with roughness values better than 0.4 μm RA and which are free from contaminants are advantageous for bonding purposes. As for isostatic pressure, much higher pressures such as 100-200 MPa may be possible and therefore surface finish is not as critical. For example, surface finishes of 0.8 μm or greater may be acceptable for the bonding process. An additional advantage of applying isostatic pressure is that the use of uniform gas pressurization allows complex geometries to be bonded, whereas uniaxial pressure generally can only be used for simple butt or lap joint bonding.

Figure 4:
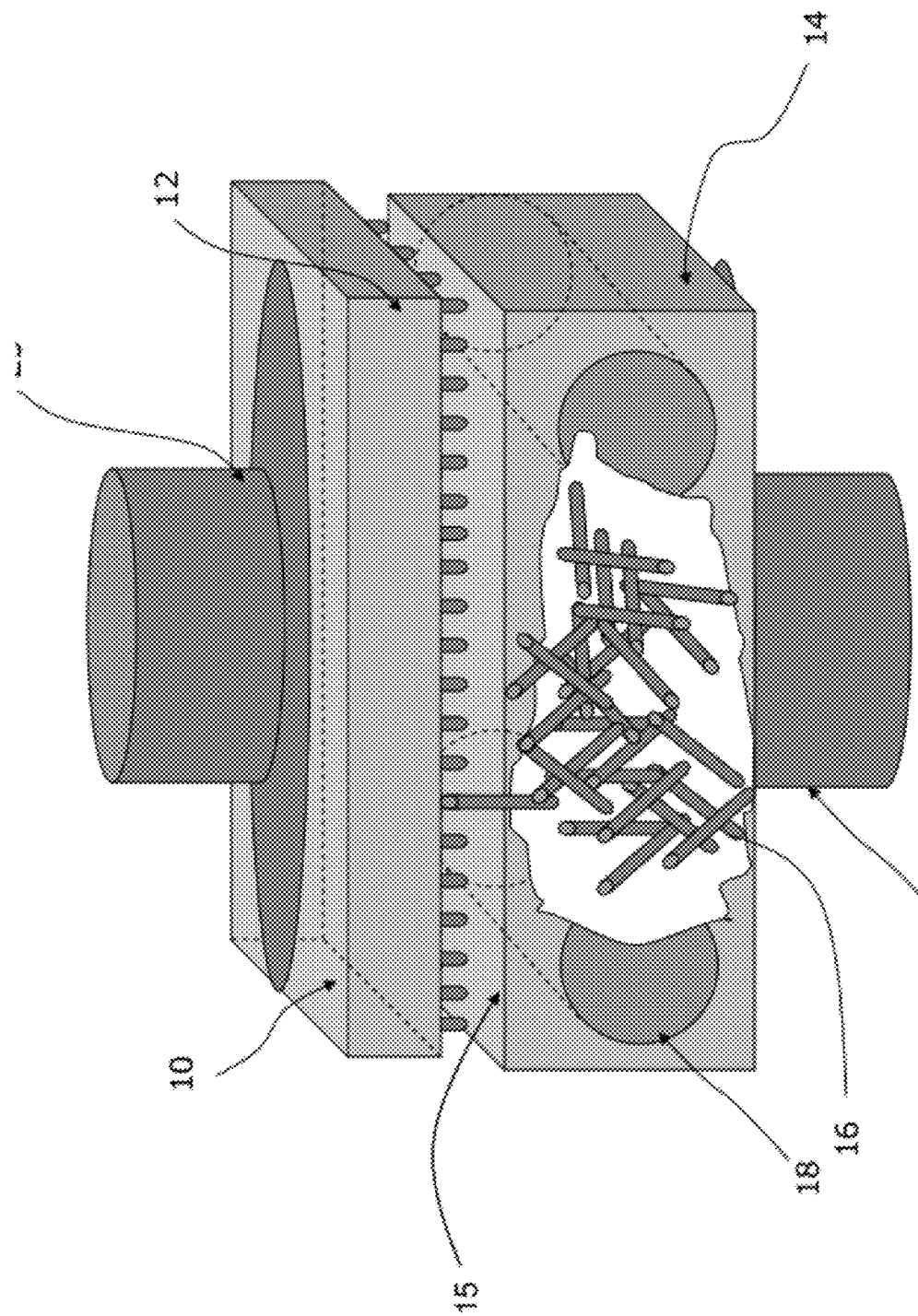
FIG. 4 is a schematic of a metal body being bonded to a non-metallic substrate via capacitor-discharge bonding.

An exemplary method for cohesive bonding is shown in FIG. 4 known as capacitor-discharge welding. In FIG. 4, a substrate 14 is provided which includes fibers 18 and a plurality of microfilaments and/or nanofilaments 16 embedded in the substrate 14. A metal body 12 is brought into contact with a surface of the substrate 14 such that a portion of the plurality of microfilaments and/or nanofilaments 16 found on the surface 15 of substrate 14 may contact the metal body 12. Capacitors (not shown) are provided to be coupled to at least one of the metal body 12 and substrate 14 through contact elements 25. Contact elements 25 may be placed onto at least one surface of the metal body 12 and/or substrate 14. Energy stored in the capacitors at specific voltages may be released or discharged through contact elements 25 to 14 and 12. As the energy is discharged, an instantaneous arc may be created which melts the adjoining surfaces of the metal body 12 and microfilaments and/or nanofilaments 16. Either simultaneously or shortly thereafter, pressure may be applied to both materials such that the materials compress against one another and a cohesive bond is formed between the metal body 12 and microfilaments and/or nanofilaments 16, as the molten metal solidifies.

The capacitor-discharge welding process is an extremely efficient method for welding a wide variety of metals including mild steel, stainless steel, aluminium, brass, copper, titanium, and other similar metals. A powerful bank of capacitors may be provided with each capacitor storing energy at a specific voltage. The capacitors may range between 450-3000 volts. The voltage may depend on the size and material of the component being formed. Large capacitor-discharge welding machines may output 400 KA of current and 50 kJ of energy. When energy is discharged, a cohesive bond may be formed in approximately 0.004 seconds or more.

The capacitor-discharge welding process is advantageous for many reasons. The short welding time localizes the heat and creates welds adjacent to heat sensitive portions of the material. The capacitor-discharge welding process provides excellent bonding with a variety of similar and dissimilar materials without requiring any water cooling, significant power requirements, nor substantial operating costs for high production rates. This process may be performed in most environments as it does not require large amounts of space and produces very little, if any, fumes or smoke.

Figure 5:
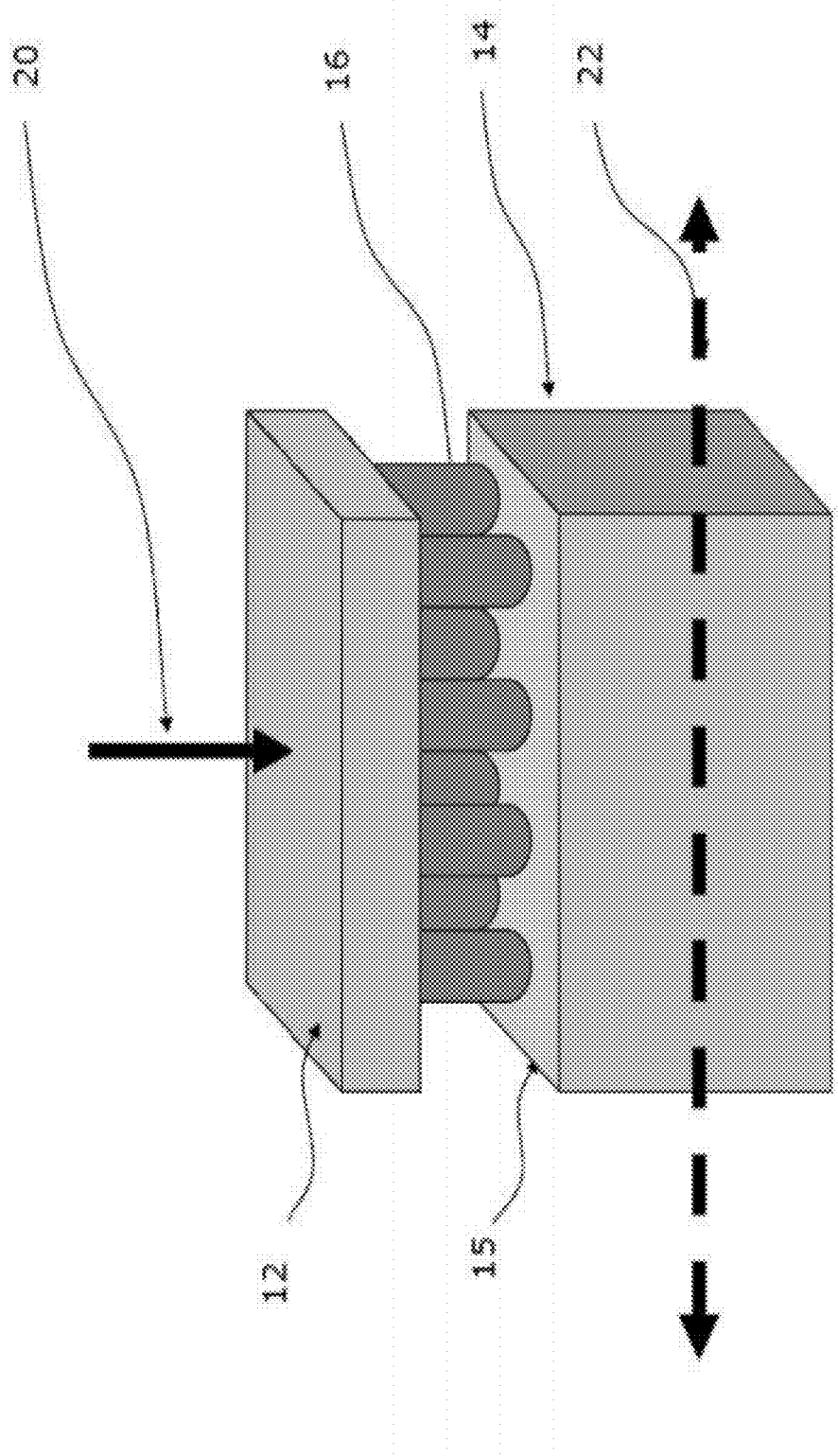
FIG. 5 is a schematic of a metal body being bonded to a non-metallic substrate via localized friction bonding.

A different cohesive bonding method referred to as localized friction bonding is shown in FIG. 5. In the embodiment of FIG. 5, the method may comprise the step of contacting a metal body 12 with a surface 15 of a substrate 14. The substrate 14 may comprise a plurality of microfilaments and/or nanofilaments 16 dispersed into and below the surface 15 of the substrate 14. The surface of the metal body 12 may have microscopic asperities (not shown) as it will be appreciated most metal surfaces are not absolutely smooth. In contacting the metal body 12 to the surface 15 of the substrate 14, the microscopic asperities of the surface of the metal body 12 may come into contact with the microfilaments and/or nanofilaments 16 of the substrate 14. The microfilaments and/or nanofilaments 16 provide microscopic asperities that aid in the bonding process and may contact the microscopic asperities of the metal body 12.

The method may also comprise the step of simultaneously applying normally-oriented pressure 20 on the metal body 12 and laterally-oriented high frequency and low amplitude vibration 22 to the substrate 14 as shown in FIG. 5. The application of the combined pressure and vibration may produce high temperatures localized between the adjoining surface of the metal body 12 and the microfilaments and/or nanofilaments 16 and may further facilitate metal transfer between the metal body 12 and the material of the microfilaments and/or nanofilaments 16 that is exposed at the surface 15 of the substrate 14. This metal transfer may result in a microcohesive or nanocohesive diffusion bond between the surface of the metal body 12 and the microfilaments and/or nanofilaments 16.

Friction bonding generally is a solid phase pressure welding process where little to no actual melting of the metal body occurs. By rubbing the adjoining surfaces of the metal body and the substrate together, sufficient heat is produced for creating local plastic zones. Accordingly, two atomically clean metal surfaces may be brought together under pressure and an inter-metallic bond is formed. The corresponding heat may be confined to the interface of the two materials. The heat input may be low and the amount of work applied to the bonded area results in grain refinement.

One advantageous characteristic associated with friction bonding is the ability to weld alloys and combinations of alloys which were previously regarded as "un-weldable." With localized friction bonding processes, it is now possible to produce dissimilar metal joints, join steel, copper, and aluminium to themselves and/or to each other, and to successfully weld alloys.

Figure 6:
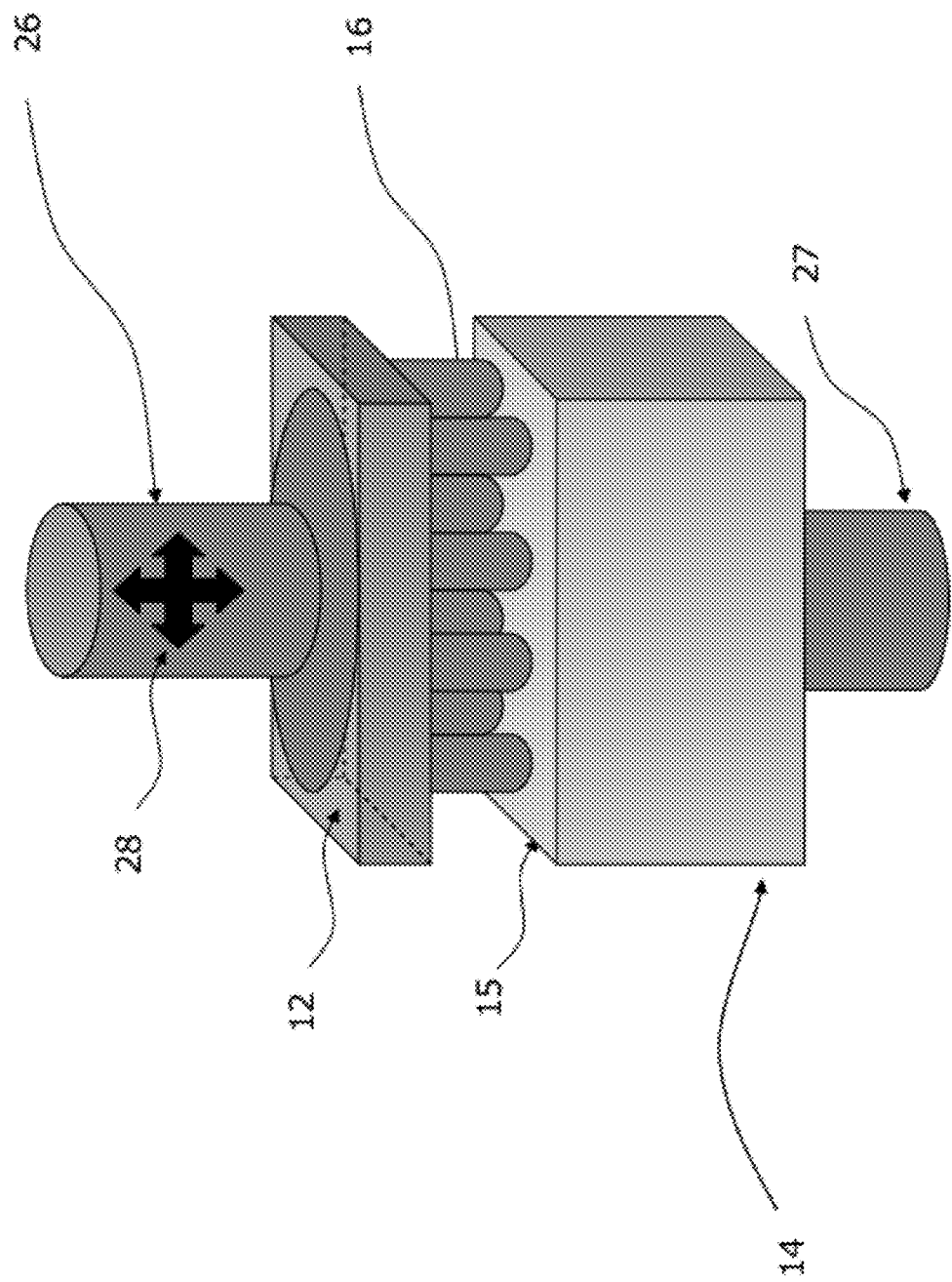
FIG. 6 is a schematic of a metal body being bonded to a non-metallic substrate via ultrasonic welding.

An alternate cohesive bonding method, ultrasonic welding, is shown in FIG. 6. In the embodiment of FIG. 6, the method may comprise the step of contacting a metal body 12 with a surface 15 of a substrate 14. The substrate 14 may comprise a plurality of microfilaments and/or nanofilaments 16 dispersed into and below the surface 15 of the substrate 14. The surface of the metal body 12 may have microscopic asperities as it will be appreciated most metal surfaces are not absolutely smooth. A sonotrode 26 may be positioned to be in contact with a surface of the metal body 12. Likewise, an anvil 27 may be positioned against a surface of the substrate 14 and it holds the materials to be welded statically together. A welding tool (not shown) may attach or couple to the material to be bonded and the tool moves in a longitudinal direction. The metal body 12 and substrate 14 may be pressed together and a generator (not shown) may produce electrical oscillations of ultrasonic frequency. In one embodiment, a transducer (not shown) may convert the electrical oscillations into mechanical vibration which in turn is transmitted to the sonotrode 26. The sonotrode transmits the ultrasonic vibrations 28 to the metal body 12 and substrate 14. Generally, the sonotrode 26 needs to be mounted tightly to the metal body 12 to avoid friction and other losses. The simultaneous action of static and dynamic forces causes the metal body 12 and substrate 14 to fuse together without requiring the addition of an extrinsic material.

For plastic materials, high frequency vertical vibrations are used to increase the temperature and plasticizes the materials. Vibrations may reach frequencies of about 20-70 kHz. During ultrasonic metal welding, a complex process is triggered involving static forces, oscillating shearing forces, and a moderate temperature increase in the welding area. The magnitude of these factors depends on the thickness of the work pieces (viz., the metal body 12 and substrate 14), their surface structure, and their mechanical properties. Typical frequencies may reach 20-40 kHz, which is above the frequency that is audible to a human ear and also permits the best possible use of energy. Generally, ultrasonic welding is used for forming small components that require less energy such as watches, cassettes, plastic products, toys, medical tools, and packaging.

Figure 7:
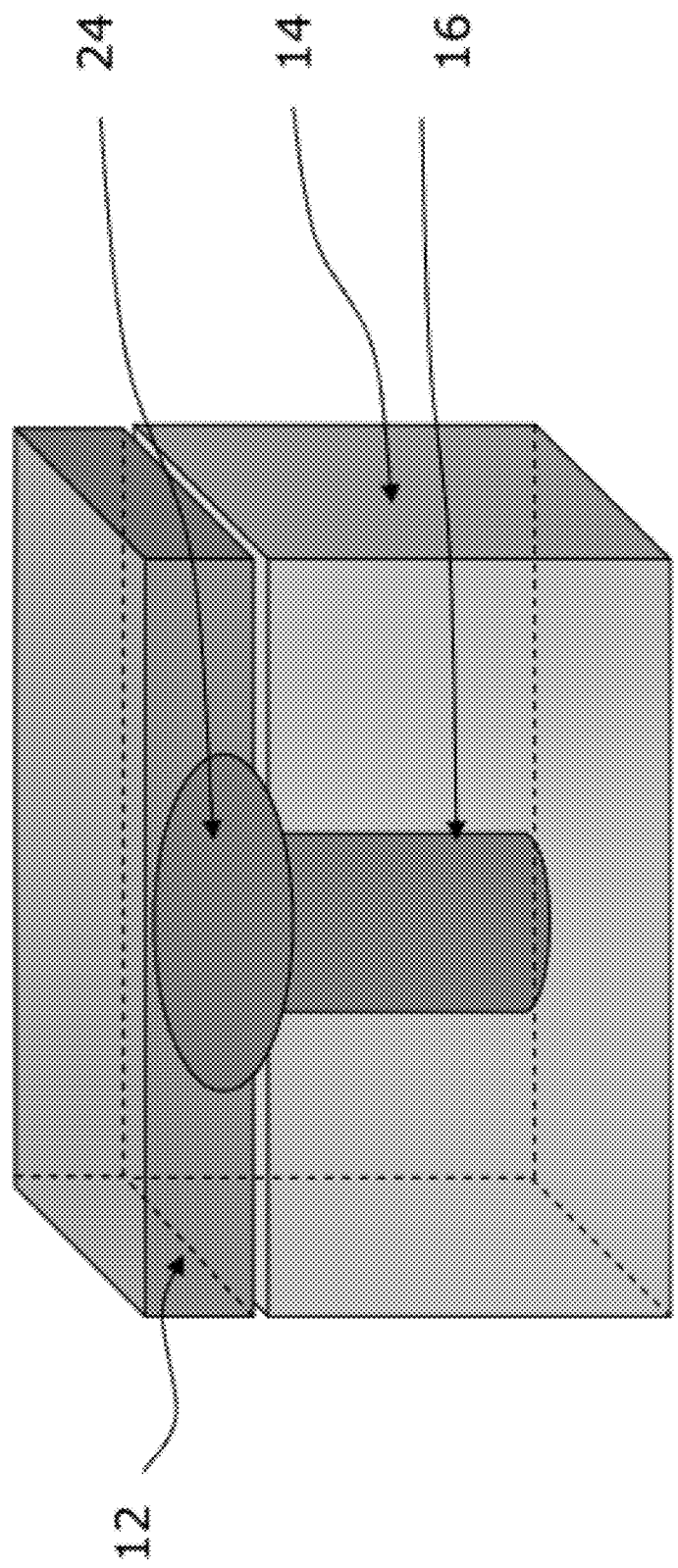
FIG. 7 is a schematic showing an enlarged view of the bond formed as the result of the method of the present invention between a metal surface and a substrate comprising microfilaments and/or nanofilaments.

In the embodiment of FIG. 7, a resulting component 24 is formed from cohesive bonding between a metal body 12 and a substrate 14. The metal body 12 may include microscopic asperities and the substrate may include a plurality of microfilaments and/or nanofilaments 16. Other components may be formed via any of the above-described methods and the type of component being made should not be limiting.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for cohesively bonding a metal body to a substrate comprising the steps of:
   coupling a plurality of capacitors through a plurality of contact elements to the metal body and the substrate;
   contacting the metal body to the substrate, the substrate comprising a plurality of microfilaments or nanofilaments, wherein the microfilaments or nanofilaments provide microscopic asperities on at least a substrate surface which contacts a surface of the metal body;
   discharging energy from the plurality of capacitors to raise the temperature of the surfaces of the metal body and the substrate which contact one another;
   applying pressure on the metal body or substrate; and
   forming a cohesive bond between the metal body and the substrate, wherein the substrate is a material comprising a metal matrix composite, a polymer composite or a ceramic composite.

2. The method of claim 1, wherein the contacting step occurs before the coupling step.

3. The method of claim 1, wherein the applying pressure step occurs simultaneously with or after the discharging step.

4. The method of claim 1, wherein the metal body consists of one of mild steel, stainless steel, aluminum, brass, copper, and titanium.

5. The method of claim 1, wherein the plurality of capacitors store energy at specific voltages dependent upon the size and material of a component being formed.

6. The method of claim 5, wherein the plurality of capacitors store energy at voltages between about 475-3000 volts.

7. The method of claim 1, wherein the forming step forms a cohesive bond free from distorting or discoloring.

8. The method of claim 1, further comprising creating an instantaneous arc which melts adjoining surfaces of the metal body and the substrate.

* * * * *